Oct. 3, 1961

R. B. NEWCOMB 3,002,545

TRACTION DEVICE

Filed Nov. 24, 1959

INVENTOR.
RAY B. NEWCOMB
BY Bosworth, Sessions,
Herstrom & Knowles
ATTORNEYS

Oct. 3, 1961 R. B. NEWCOMB 3,002,545
TRACTION DEVICE

Filed Nov. 24, 1959 2 Sheets-Sheet 2

INVENTOR.
RAY B. NEWCOMB
BY Boworth, Sessions,
Herrstrom & Knowles
ATTORNEYS

United States Patent Office 3,002,545
Patented Oct. 3, 1961

3,002,545
TRACTION DEVICE
Ray B. Newcomb, Garrettsville, Ohio, assignor to Positive Traction, Inc., Parkman, Ohio, a corporation of Ohio
Filed Nov. 24, 1959, Ser. No. 855,191
11 Claims. (Cl. 152—225)

This invention relates to a traction device for use with the driving wheels of self-propelled vehicles and particularly to such a traction device characterized as self-engineering and suitable for field attachment.

The tractive effort developed by a self-propelled wheeled vehicle is dependent upon the amount of traction obtainable at the area of contact between the driving wheel or wheels and the surface upon which the wheels bear. The amount of traction that can be secured varies with the nature of the surface upon which the vehicle is riding and the periphery of the driving wheel. Many wheel designs and tire configurations have been devised which provide maximum traction under some surface conditions but suffer from disadvantages in operation under other surface conditions. For instance, tires suitable for general use on packed earth or in relatively high-speed travel on pavement do not develop sufficient useful traction in soft earth or mud.

In the past, traction attachments have been used in an attempt to adapt generally useful wheels or tires for service under special surface conditions. A common one of these special surface conditions is found in soft or uncompacted earth. The effectiveness of past devices for securing traction under such conditions is generally reduced by the clogging of the traction-securing device by the very soft earth or mud itself which adheres and clings to the device. Also, the compactness of the earth requiring the use of traction attachments varies greatly and with it the amount of work required of the traction device. In order to be equally effective under all circumstances, therefore, a traction attachment must be able to accommodate various surface conditions as they are encountered.

It is, therefore, a principal object of my invention to provide a traction device for use on self-propelled vehicles driven by wheels having generally useful traction properties which provides traction between driving wheels and a surface of soft or unpacked material up to the limit of the driving power available without losing any of its effectiveness in operation. Another object of my invention is to provide a traction device that is self-engineering in providing traction proportional to the softness of the material upon which the device bears. It is still another object of my invention to provide a traction device that is self-engineering in cleaning itself of any material that seeks to cling and adhere to it.

Briefly, the traction device of this invention and which accomplishes these objects is of the type characterized by a number of traction elements spaced about the periphery of the wheel. The elements extend generally across the tread of the wheel and are held in place by tension elements such as chains linking the corresponding ends of adjacent traction elements together. The novel operation of the traction device of this invention depends upon, among other things, certain features of the design of the traction elements and their relationship to each other and to the tension elements linking them together.

The foregoing and other objects of my invention will become more apparent to one skilled in the art through an understanding of the following description of a preferred form and the accompanying drawings in which.

Figure 1:
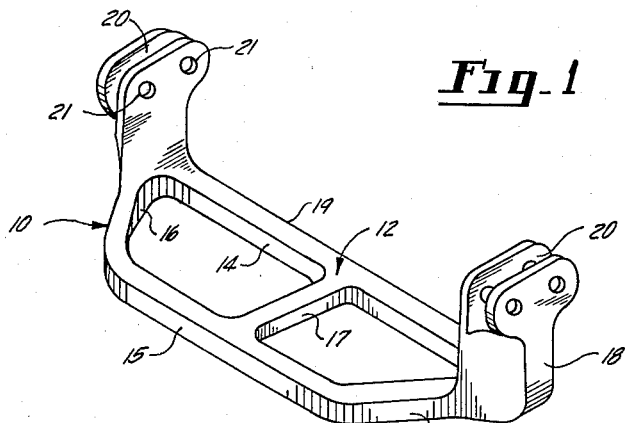
FIGURE 1 is a perspective view of one of the single spade elements that comprise the complete traction device of my invention.
Figure 2:
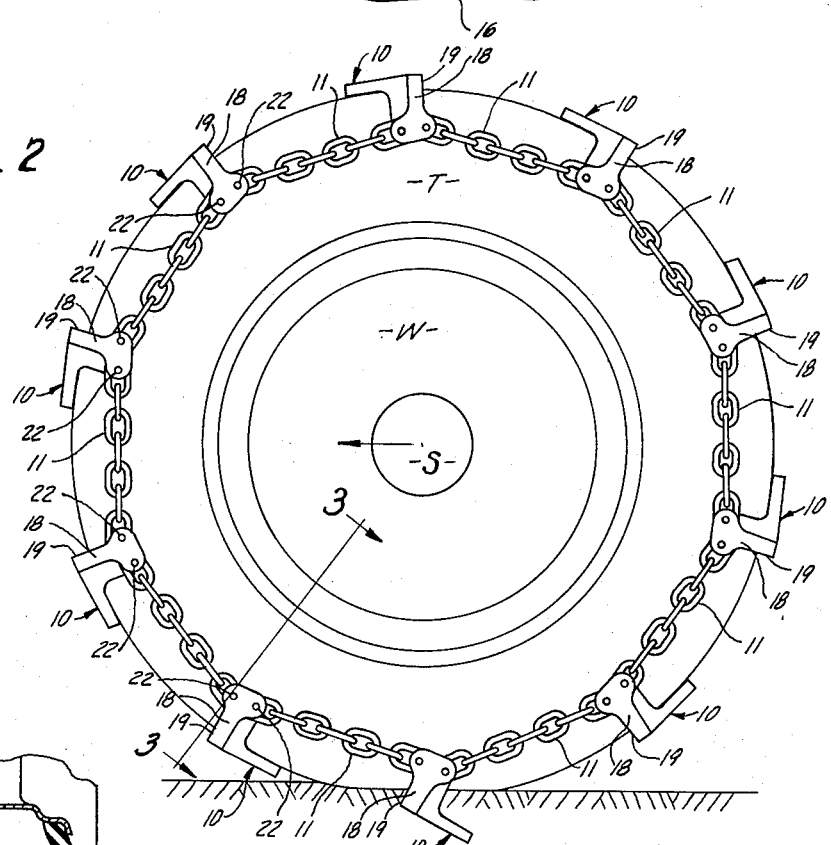
FIGURE 2 is a side view of a wheel having a toroidal-shaped tire mounted on it and that is equipped with a traction device embodying my invention with one of the elements in operating position.

The general arrangement of the traction device of this invention is shown in FIGURE 2 and includes a number of spade elements 10 such as the one shown in FIGURE 1 circumferentially spaced about the periphery of a driving wheel W. By a driving wheel, I mean a wheel of a self-propelled vehicle which is turned by torque applied to the shaft S on which it is mounted and which wheel in turn drives or propels the vehicle over the surface upon which the wheel bears. The spade elements 10 are held in position by tension elements or chains 11 linking the corresponding ends of adjacent spade elements 10. The tension elements 11 hold the spade elements against the periphery of wheel W and in spaced relation to each other.

As seen in FIGURE 1, each spade element 10 has a substantially flat tread portion indicated generally by 12 comprised of two parallel members 14 and 15 joined by a transverse member 16 at each end and another transverse central member 17 equidistant from each end. All of the members 14, 15, 16 and 17 lie substantially in the same plane and together form a rigid grid that constitutes the tread portion 12. My invention is not limited to a tread portion having the grid pattern nor the shape shown in FIGURE 1, however, and requires only that the tread portion be approximately flat and have a substantially straight forward edge as formed by member 14 in FIGURE 1.

Figure 3:
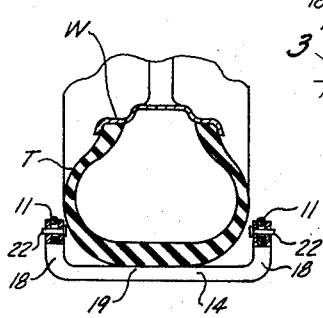
FIGURE 3 is a partial transverse section through the tire and traction device shown in FIGURE 2, taken along the line 3—3 in FIGURE 2.

A pair of control arms 18 extend upwardly from tread portion 12 at opposite ends of the forward edge 19. I prefer that control arms 18 be perpendicular to forward edge 19 and inclined with respect to the plane containing tread portion 12. The inclination of the arms 18 should preferably be such that when the flat tread portion 12 is placed across the width of and in a plane tangential to the tire T at the point of contact of the tread portion 12 and the tire T the control arms 18 will be radially directed to the center of wheel W. As can be seen in FIGURE 3, the spacing between the control arms 18 should be such that when the spade element is placed on the tire T with the tread of the tire T engaging the flat tread portion 12 of the spade element 10, the free ends of the control arms lightly engage the side walls of the tire. The control arms 18 thus serve to keep the spade elements from sliding sideways off the tire as well as to control the spading action of each element as will be described below.

It will also be noted that the forward edge 19 of the tread portion 12 and the control arms 18 do not conform to the cross section of the tire T. I prefer this configuration of the control arms 18 and forward edge 19 as seen in FIGURE 3 so that the forward edge 19 of the spade elements may comprise a straight line of contact with the tire T about which tipping of the spade element may take place in a manner hereinafter described in connection with the operation of the device.

The radially inward ends of each of the control arms 18 have radially extending slots 20 lying in planes substantially perpendicular to the axis of the wheel. Each slot 20 results in the formation of a forked, radially inward end on each of the control arms 18 through which pass two pairs of holes 21 axially aligned in a direction parallel to the axis of the wheel. The two pairs of holes are circumferentially spaced apart from each other. A pin 22 extends through each pair of axially aligned holes 21 from one branch of the forked end to the other end, bridging the slot 20. The slots 20 are adapted to receive the end link of the chain or tension elements 11 extending between each control arm 18 of each spade element 10 and the control arms 18 of the two adjacent spade elements 10. A pin 22 passes through the end link of each of the two chains or tension elements 11 extending to each control arm 18 thereby connecting the tension elements 11 to control arm 18. I prefer that the slots 20 have a width that will hold the end link substantially in the plane of the control arm 18 to which it is attached so that the link, when connected by a pin 22, is free to pivot about its connecting pin 22 substantially only in a plane perpendicular to that pin.

By means of the radially inward forked end of each control arm 18, two circumferentially spaced apart holes 21 therethrough and two connecting pins 22, I provide two separate and circumferentially spaced pivotal connections at which two chains or tension elements 11 have engagement with each control arm 18. The two chains or tension elements are connected to the control arms 18 by means of the pins 22 nearest the direction from which they respectively approach the control arm 18 when the traction device is in place on a wheel. I have found a satisfactory radial and circumferential spacing for the two pivotal connections in each control arm is that which locates the pivotal connections radially inward of the tread portion approximately half the circumferential length of the tread portion and circumferentially apart approximately half of the radial distance between the pivotal connections and the tread portion.

I also prefer that the rearward pair of holes 21 in each control arm 18, as viewed when the spade element 10 containing them is at the bottom of the wheel and in contact with the earth, be radially more distant from the center of the wheel than the other or forward pair of holes 21 in the control arm. By this arrangement of the pairs of holes 21 in each control arm, I provide a relationship between the points of articulation of the pairs of holes and their associated tension elements which tends to hold the flat tread portion 12 of each of the spade elements 10 in general contact with the tire T, but which permits the spade-like separation of the rearward part of the spade element as required during the operation of the device as described below.

While I prefer the above-described structure and means for connecting the tension elements 11 with the control arms 18 of each of the spade elements 10, I do not intend that the invention be limited to this particular structure and means as any other manner and method of connection that provides two circumferentially spaced apart positive points of articulation for joining the two associated tension elements 11 with each control arm 18 is suitable. The tension elements 11 may be any means adapted to act in tension and which may be pivotally connected to the control arms 18.

In operation, the traction device comprises a plurality of spade elements 10 circumferentially disposed and spaced around the periphery of the tire T mounted on a driving wheel of an automotive vehicle. For example, ten spade elements 10 might be used on a tire having an outside diameter of 54 inches. The spade elements 10 are oriented so that they follow each other about the tire, that is, the forward edge 19 of one spade element is adjacent the rear portion of the next successive spade element and so that the forward edge 19 of the particular spade element at the bottom of the wheel and in contact with the earth faces in the direction of travel of the automotive vehicle during which the device will provide the more effective traction.

Figure 4:
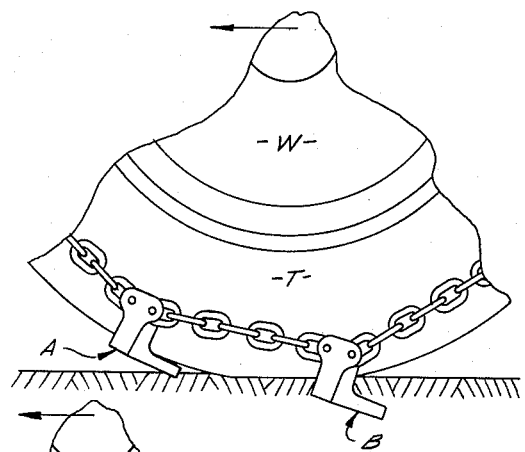
FIGURES 4, 5 and 6 are each side views of a portion of a wheel and tire equipped with a traction device of my invention and which illustrate in progressive fashion the operation of the device in soft earth.
Figure 5:
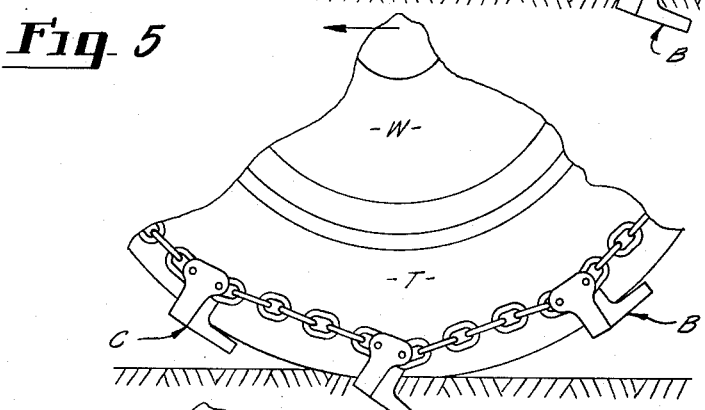
Figure 6:
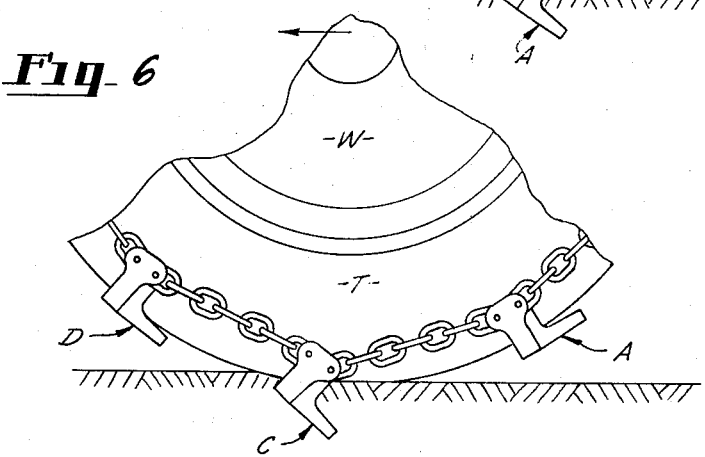

I will now describe the operation of my traction device as I understand it from observing it while in use. FIGURES 4, 5 and 6 show portions of the same wheel and designated spade elements of the traction device mounted thereon in successive positions as the wheels roll in the direction indicated by the arrows over uncompacted material.

In FIGURE 4, the particular spade element designated A is on the forward underside of the tire approaching the earth and held by the tension elements 11 connected to it in operative contact with the tread of the tire, the flat tread portion having approximately tangential contact therewith. The particular spade element designated B is tipped about its forward edge 19 and line of contact with the tire so that its flat tread portion is peeled away from the tire and in spading engagement with the earth. The wheel is prevented from slipping by the engagement of spade element B with the earth because spade element B provides a substantially fixed point of engagement with the earth with reference to which the wheel can pull itself forward through the rearward tension elements attached to spade element B.

In FIGURE 5, the wheel has rolled forward a sufficient distance to bring spade element A under the wheel and in engagement with the earth. The wheel has rolled beyond the point of engagement of spade element B with the earth and spade element B has been pulled out of spading engagement. Another spade element, designated C, is shown on the forward underside of the tire approaching the earth as was spade element A in FIGURE 4.

As the wheel rolls from its position shown in FIGURE 4 to that of FIGURE 5, spade element A is brought into engagement with the earth in its position of operative contact with the tread of the tire. It appears from my observation that at the time spade element B is disengaged from the earth and while the flat tread portion of spade element A is under the wheel in operative contact with and under the tire, a slight slippage occurs between the tire and the earth and between the tire and spade element A. This slippage advances the forward edge 19 along the tread of the tire and, at the same time, peels away the flat tread portion of spade element A from contact with the tread of the tire, tipping the spade element A around its forward edge 19 along its advanced line of contact with the tire and into a position of spading engagement with the earth as shown in FIGURE 5.

It will be noted that as spade element A tips, the control arms 18 are inclined rearwardly from their normally radial disposition. This movement of the control arms 18 displaces the two pivot pins 22 in each control arm of the tipped spade element out of circumferential alignment and causes the circles of tension elements 11 to be shortened, increasing the tension therein and drawing all of the spade elements 10 comprising the traction device into tighter radial engagement with the tire T. Thus, after each spade element bites into the earth, any tendency of the traction device to slip on the tire T is resisted by the self-induced increase in the grip with which the device clings to the tire and which is proportional to the size of the bite of the spade inducing it.

When tire T has rolled to the position shown in FIGURE 6, the spade element A is again out of contact with the earth and on the rearward side of the tire T with its flat tread portion 10 in close engagement with the tire tread and in approximately tangential contact therewith. The spade element C following spade element A around the wheel is in spading engagement with the earth having been tipped about its advanced forward edge by the small amount of slippage between the tire T and the earth and between the tire and spade element C occurring when spade element A was rolled out of spading engagement with the earth. The pivot pins 22 of spade element A are returned to their circumferential alignment by the tension in the circle of tension elements 11. When this occurs, the flat tread portion of spade element A is forcefully returned to its position of normal engagement with the tread of the tire T very quickly and with considerable impact, the rear portion of the tread portion 12 striking the tire with some force. As I understand it, the returning motion of spade element A to a position of engagement of its flat tread portion with tire T from its tipped or spading position shown in FIGURE 5 is imparted to it by the action and cooperation of the continuous circle of tension elements 11 acting through the circumferentially spaced articulation points on the control arms 18. Any earth tending to cling to the particular spade element A is knocked from the structure as well as being thrown therefrom by the centrifugal force of the element's movement about its forward edge 19. The self-cleaning operation just described is enhanced by the flat tread portion 12 of the spade element being substantially open and providing avenues of escape for the earth that tends to cling to the element.

Thus, it will be seen that I have provided a traction device which enables the driven wheels of an automotive vehicle to have a driving connection with soft earth upon which they bear that is proportional to the torque applied to the wheels and the softness of the earth encountered and which maintains itself free of clogging earth that would inhibit the successful attainment of the desired traction.

Changes, modifications and improvements may be made to the above-described preferred form of my invention without departing from the precepts and principles of the invention. Therefore, I do not wish my patent to be limited to the particular form of my invention specifically illustrated and described nor in any manner inconsistent with the extent to which my invention has promoted the art.

I claim:

1. Traction apparatus for an automotive vehicle tire adapted to be held thereon by substantially oppositely acting tension means and comprising a tread portion having a substantially straight forward edge parallel to the axis of the wheel and a substantially flat face adapted for mounting in approximately tangential contact with the tread of said tire, a pair of laterally spaced control arms extending radially inwardly from and substantially normal to said flat face of said tread portion and adjacent said forward edge, and each having a pair of separate and circumferentially spaced pivotal connection means spaced radially inward from the forward portion of and in fixed relationship with said flat face for connecting the tension means to said traction apparatus.

2. A traction apparatus according to claim 1 in which said pairs of pivotal connection means are spaced radially inward from the forward portion of said flat face a distance approximately one-half the circumferential length of said flat face.

3. A traction apparatus according to claim 1 in which said pair of pivotal connection means in each of said control arms is circumferentially spaced apart approximately one-half the distance between said pivotal connection means and said flat face.

4. A traction apparatus according to claim 1 in which said forward one of each pair of pivotal connection means in each of said control arms is radially closer to the center of said tire than the other one of each of said pairs of pivotal connection means.

5. A traction apparatus for an automotive vehicle tire comprising a tread portion having a substantially straight forward edge parallel to the axis of the wheel and a substantially flat face adapted for mounting an approximately tangential contact with the tread of said tire, a pair of laterally spaced control arms extending radially inward from and substantially normal to said flat face of said tread portion and substantially radially adjacent said forward edge and each having a pair of separate and circumferentially spaced pivotal connection means in fixed relationship with said face, and a pair of substantially oppositely directed tension means connected to each pair of pivotal connection means, said tension means permitting pivotal motion of said tread portion about said forward edge thereof and away from said tire upon sliding engagement of said traction apparatus with the medium supporting said tire while tending to hold said forward edge of said tread portion in contact with the tread of said tire and tending to return said flat face of said tread portion into tangential contact with the tread of said tire upon disengagement of said traction apparatus from the medium supporting said tire.

6. A traction apparatus according to claim 5 in which said pair of pivotal connection means in each of said control arms is circumferentially spaced apart approximately one-half the distance between said pivotal connection means and said flat face.

7. A traction apparatus according to claim 5 in which said forward one of each pair of pivotal connection means in each of said control arms is radially closer to the center of said tire than the other one of each of said pairs of pivotal connection means.

8. A traction device for a tire of an automotive vehicle comprising a plurality of spade elements circumferentially disposed and spaced around the tread of the tire and chains connecting adjacent ones of said elements to each other and constraining them into contact with the tread of the tire, each element having a substantially flat tread portion and a pair of laterally spaced control arms, said tread portion extending across the width of the tire in approximately tangential contact therewith and having a substantially straight forward edge that is parallel to the axis of the wheel, each of said control arms connected at one end of the forward edge of said tread portion and extending radially therefrom along one of the side walls of said tire and having a pair of separate and circumferentially spaced pivot pins spaced radially inwardly from and in fixed relationship with said tread portion for connecting said chains to said spade elements, the midpoint of the circumferential distance between each pair of said pivot pins being approximately radially opposite the forward edge of its associated spade element.

9. A traction device for a tire of an automotive vehicle comprising a plurality of spade elements circumferentially disposed and spaced around the tread of the tire, each element having a substantially flat tread portion and a pair of laterally spaced control arms, said tread portion extending across the width of the tire in approximately tangential contact therewith and having a substantially straight forward edge that is parallel to the axis of the wheel, each of said control arms connected adjacent the forward edge of said tread portion and extending radially therefrom adjacent one of the side walls of said tire and having a pair of separate and circumferentially spaced pivotal connection means spaced radially inwardly from the forward portion of and in fixed relationship with said tread portion and tension means interconnecting proximate connection means of adjacent ones of said spade elements, said tension means permitting pivotal motion of each spade element about its forward edge and away from said tire upon sliding engagement of each spade element with the medium supporting said tire and tending to return said flat face of each of said spade elements into tangential contact with the tread of said tire upon disengagement of the spade element from said medium supporting said tire and tending to hold said forward edge of each of said spade elements in contact with the tread of said tire.

10. A traction apparatus according to claim 9 in which said pairs of pivotal connection means are spaced radially inward from the forward portion of said flat face a distance approximately one-half the circumferential length of said flat face.

11. A traction apparatus according to claim 9 in which said pair of pivotal connection means in each of said control arms is circumferentially spaced apart approximately one-half the distance between said pivotal connection means and said flat face and in which one of said pair of pivotal connection means in each of said control arms lies circumferentially forward of the forward edge of the associated spade element.

References Cited in the file of this patent

UNITED STATES PATENTS

| | | |
|---|---|---|
| 1,371,140 | Bellach | Mar. 8, 1921 |
| 1,480,139 | Anderson | Jan. 8, 1924 |
| 1,942,338 | Kennedy | Jan. 2, 1934 |
| 2,671,489 | Henderson | Mar. 9, 1954 |
| 2,693,839 | Tutton | Nov. 9, 1954 |